US012781651B2

(12) United States Patent
Jenni et al.

(10) Patent No.: US 12,781,651 B2
(45) Date of Patent: Nov. 3, 2026

(54) 4-STROKE 3-CYLINDER ENGINE

(71) Applicant: Polaris Industries Inc., Medina, MN (US)

(72) Inventors: Hans-Rudolf Jenni, Burgdorf (CH); Ronald Zurbruegg, Burgdorf (CH); Niclas Roch, Burgdorf (CH); Marcel Frei, Burgdorf (CH); James H. Buchwitz, Roseau, MN (US); Darren J. Hedlund, Roseau, MN (US); Matthew D. Reeves, Wyoming, MN (US); Beat R. Kohler, Burgdorf (CH)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 18/915,568

(22) Filed: Oct. 15, 2024

(65) Prior Publication Data

US 2025/0122817 A1 Apr. 17, 2025

Related U.S. Application Data

(60) Provisional application No. 63/544,269, filed on Oct. 16, 2023.

(51) Int. Cl.

| | |
|---|---|
| ***F01M 13/00*** | (2006.01) |
| ***F01M 1/02*** | (2006.01) |
| ***F01M 11/00*** | (2006.01) |
| ***F01M 11/02*** | (2006.01) |
| ***F01P 7/16*** | (2006.01) |
| ***F02B 75/02*** | (2006.01) |
| ***F02B 75/18*** | (2006.01) |
| ***F02F 1/40*** | (2006.01) |
| ***F02N 11/04*** | (2006.01) |

(Continued)

(52) U.S. Cl.

CPC .......... *F01M 13/0011* (2013.01); *F01M 1/02* (2013.01); *F01M 11/0004* (2013.01); *F01M 11/02* (2013.01); *F01P 7/16* (2013.01); *F02B 75/02* (2013.01); *F02B 75/18* (2013.01); *F02F 1/40* (2013.01); *F02N 11/04* (2013.01); *F16C 9/02* (2013.01); *F01P 2007/146* (2013.01); *F02B 2075/027* (2013.01); *F02B 2075/1812* (2013.01)

(58) Field of Classification Search

CPC .. F01M 13/0011; F01M 1/02; F01M 11/0004; F01M 11/02; F01P 7/16; F01P 2007/146; F02B 75/02; F02B 75/18; F02B 2075/027; F02B 2075/1812; F02F 1/40; F02N 11/04; F16C 9/02

See application file for complete search history.

(56) References Cited

U.S. PATENT DOCUMENTS 5,275,231 A * 1/1994 Kuze .................. G05D 23/1333 123/41.1

2013/0125843 A1 * 5/2013 Fukuoka ................... F01P 3/02 123/41.1

(Continued)

*Primary Examiner* — Syed O Hasan

(74) *Attorney, Agent, or Firm* — Merchant & Gould P.C.

(57) ABSTRACT

An engine is provided including a crankshaft with an optimized bearing configuration, an integrated starter-generator, an integrated thermostat configured to improve cold start performance, an integrated water system including the integrated thermostat, an integrated oil tank breathing system, and an integrated engine breather system.

8 Claims, 11 Drawing Sheets

(51) Int. Cl.
*F16C 9/02* (2006.01)
*F01P 7/14* (2006.01)

(56) References Cited

U.S. PATENT DOCUMENTS

| | | | | |
|---|---|---|---|---|
| 2016/0084147 | A1* | 3/2016 | Sotani | F01M 1/02<br>123/196 A |
| 2016/0090895 | A1* | 3/2016 | Sakurai | F01P 1/06<br>123/41.1 |
| 2018/0223721 | A1* | 8/2018 | Matsushita | F01P 3/20 |

* cited by examiner

4-STROKE 3-CYLINDER ENGINE

CROSS-REFERENCE TO RELATED APPLICATIONS

The present application claims priority to U.S. Provisional Application Ser. No. 63/544,269, filed Oct. 16, 2023, the entire disclosure of which is incorporated herein by reference.

BACKGROUND

Vehicle engines perform a variety of functions to achieve a desired level of performance in a variety of different environments. Generally, maintaining low friction between moving parts is desirable. Lubricant is delivered to various components of such engines to reduce friction. Additionally, coolant is routed to various components of such engines to maintain the components within a desired temperature range. The manner in which such vehicle engines are designed may provide enhanced performance and/or simplification of the engine.

SUMMARY

According to one embodiment of the present disclosure, a crankshaft assembly is provided. The assembly includes a one-piece crankshaft having a front main bearing journal, a rear main bearing journal, and a plurality of intermediate journals positioned between a plurality of piston assemblies. The assembly also includes a first rolling element mounted to the front main bearing journal, a second rolling element mounted to the rear main bearing journal, and a plurality of plain bearings mounted to the plurality of intermediate journals.

According to another embodiment, the present disclosure provides an integrated starter-generator for a 4-stroke 3-cylinder engine, which includes a flywheel including a disk surrounding a central bore configured to receive a crankshaft of the engine and an annular wall extending from a periphery of the disk, the annular wall having a magnetized inner surface, and a stator coaxially disposed within the annular wall of the flywheel, the stator includes a plurality of coils. Upon activation of the integrated starter-generator to start the engine, the plurality of coils are energized to cause the flywheel to rotate, thereby rotating the crankshaft. During operation of the engine, rotation of the flywheel induces current flow in the plurality of coils.

According to yet another embodiment, the present disclosure provides a thermostat configuration, including a main return path formed in a cylinder head of an engine and configured to receive coolant from cylinders of the engine, a radiator return path formed in the cylinder head and in flow communication with the main return path, the radiator return path also in flow communication with a radiator outlet configured to deliver coolant to a radiator of the engine, a thermostat chamber formed in the cylinder head, the thermostat chamber being in flow communication with a radiator inlet configured to receive coolant from the radiator, a bypass opening configured to receive coolant from the main return path, and a water pump return path configured to deliver coolant to a water pump of the engine, and a thermostat positioned in the thermostat chamber including a first valve plate, a second valve plate and a temperature sensitive element which causes the first valve plate and the second valve plate to move together between opened and closed positions depending upon a temperature of the coolant in the thermostat chamber.

According to another embodiment of the present disclosure, a water system for a 4-stroke 3-cylinder engine is provided. The system includes a cylinder head including a plurality of cylinders, a plurality of passageways in flow communication with the plurality of cylinders, a main return path in flow communication with the plurality of passageways, a radiator return path in flow communication with the main return path, a thermostat chamber, a water pump return path in flow communication with the thermostat chamber, a water pump in flow communication with the water pump return path, and a plurality of coolant passageways in flow communication with the plurality of cylinders. The system also includes a thermostat positioned within the thermostat chamber and configured to control a flow of coolant to the water pump based upon a temperature of coolant in the main return path.

In still another embodiment, the present disclosure provides an oil tank breathing system, which includes an oil pressure pump, an oil return pump, an oil tank defining an internal volume, a breather line positioned in the oil tank and having an opening at one end within the internal volume and an outlet port at another end, an oil return line extending into the oil tank, the oil return line having a first opening at one end within the internal volume and a second opening in flow communication with the oil return pump to return oil to the oil tank, an oil outlet line in flow communication with an oil outlet port of the oil tank and the oil pressure pump to remove oil from the oil tank, and a valve positioned in the breather line, the valve having a movable portion that is biased by a spring portion toward a closed positioned wherein the movable portion is seated against an inlet of the valve to prevent oil from flowing out of the oil tank through the breather line.

In another embodiment, the present disclosure provides an integrated breather system for engine. The system includes a labyrinth integrated into a head cover of the engine including a pass through opening which directs air and oil to a siphon inlet formed in the engine, a breather outlet integrated into the head cover in flow communication with a siphon outlet formed in the engine, and a siphon integrated into the engine in flow communication with the siphon inlet, the siphon outlet and an oil return tube which delivers oil from the siphon to a crank chamber of the engine in response to a vacuum in the crank chamber, the siphon outlet releasing air from the siphon to an airbox through the breather outlet.

BRIEF DESCRIPTION OF THE DRAWINGS

The above-mentioned and other advantages and objects of this disclosure, and the manner of attaining them, will become more apparent, and the disclosure itself will be better understood, by reference to the following description of embodiments of the invention taken in conjunction with the accompanying drawings, wherein.

Figure 1:
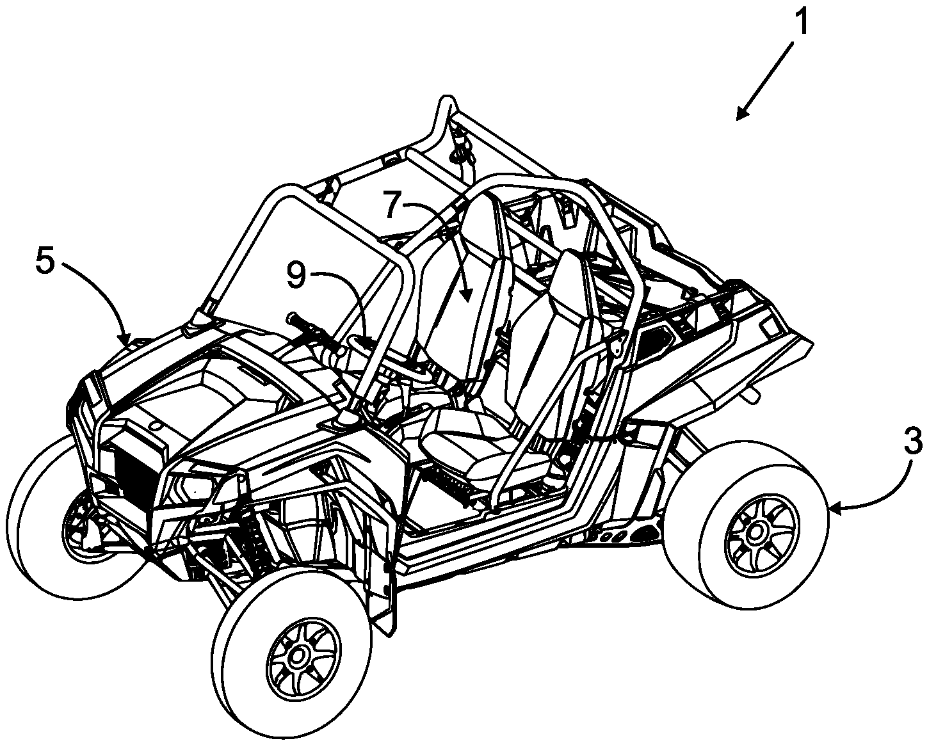
FIG. 1 is a conceptual drawing of a first vehicle.

Corresponding reference characters indicate corresponding parts throughout the several views. Although the drawings represent embodiments of the present disclosure, the drawings are not necessarily to scale, and certain features may be exaggerated or omitted in some of the drawings in order to better illustrate and explain the present disclosure.

DETAILED DESCRIPTION

It is desirable to reduce friction generated by operation of an engine crankshaft to enhance the performance of the engine and useful life of the crankshaft. According to one embodiment of the present disclosure, a ball bearing is used on a front main bearing journal of the crankshaft and a pair of roller bearings are used on the rear main bearing journal. This configuration provides reduced friction as compared to the use of plain bearings, but also permits the use of a one-piece crankshaft.

Additionally, it is desirable to reduce the weight of vehicle engines and simplify the packaging of various components. According to one embodiment of the present disclosure, an integrated starter-generator for a 4-stroke, 3-cylinder engine is provided to replace a conventional starter and generator. This configuration reduces weight and mass of inertia, simplifies packaging and enables functions such as start assist.

Control of the flow of coolant such as water through an engine is desirable to prevent overheating and associated damage and to increase the temperature of moving parts of the engine under cold-start conditions, thereby reducing friction by enhancing the flow of lubrication. According to one embodiment of the present disclosure, a thermostat is integrated into the cylinder head of the engine and includes a temperature sensitive element that controls the flow of coolant from the engine cylinders and the radiator to the water pump to provide higher temperature coolant from the engine cylinders under cold-start conditions to heat the engine faster and lower temperature coolant from the radiator under normal operating conditions. This design provides a simplified water system integrated into the engine, which simplifies routing of coolant to components of the vehicle and improves packaging and temperature control.

Certain vehicles are sometimes operated in a manner that places the engine of the vehicle at relatively high angles relative to horizontal, which may result in draining of oil from the vehicle oil tank into the crank chamber of the engine, especially when the engine is no longer running. According to one embodiment of the present disclosure, a reed valve is positioned in the oil tank breather line to prevent the oil from flowing into the crank chamber by maintaining a vacuum in the oil tank and to permit the flow of air out of the oil tank.

In another embodiment, the breather system of the engine also includes a labyrinth integrated into the valve cover which is in flow communication with a siphon with active draining to the crank chamber. In this embodiment, a reed valve is used to close an opening from the crank chamber to the oil pan to maintain a vacuum in the crank chamber while the engine is running. In this manner, the engine may be oriented in steep drive angles without losing oil into the breather system. These integrated components simplify the design and improve packaging.

Referring now to FIG. 1, an exemplary embodiment of a vehicle 1 is shown. The vehicle 1 is a side-by-side. However, the following disclosure is applicable to side-by-sides, personal watercraft (FIG. 2), snowmobiles (FIG. 3), and other types of vehicles, such as all-terrain vehicles, motorcycles, utility vehicles and golf carts. Vehicle 1 includes a plurality of ground-engaging members 3 that support a frame 5. The frame 5 supports a prime mover (not shown), seats 7 and a steering mechanism 9.

Figure 2:
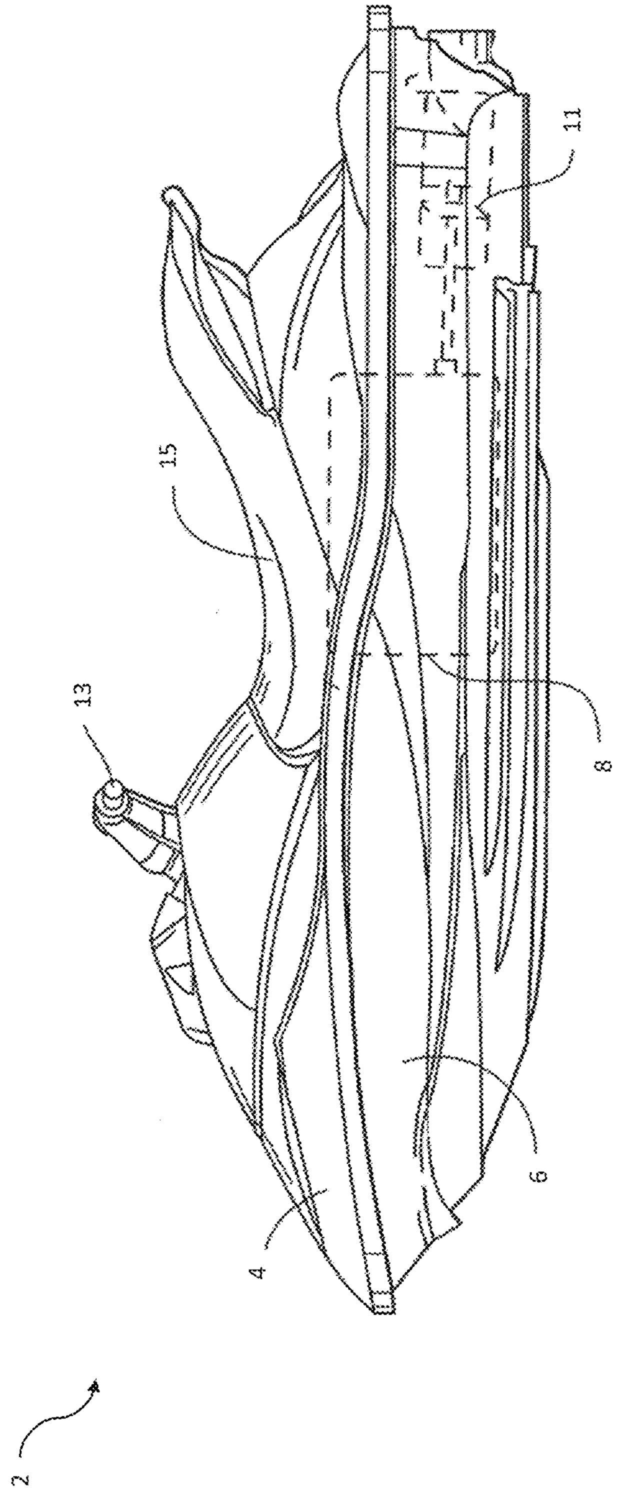
FIG. 2 is a conceptual drawing of a second vehicle.

Referring to FIG. 2, another exemplary embodiment of a vehicle 2 is shown. In this example, the vehicle 2 is a personal watercraft including a top deck 4 secured to a bottom hull 6 in which is disposed a prime mover 8 which powers a jet propulsion unit 11 that is steerable using handlebars 13 when sitting on or standing over the seat 15.

Figure 3:
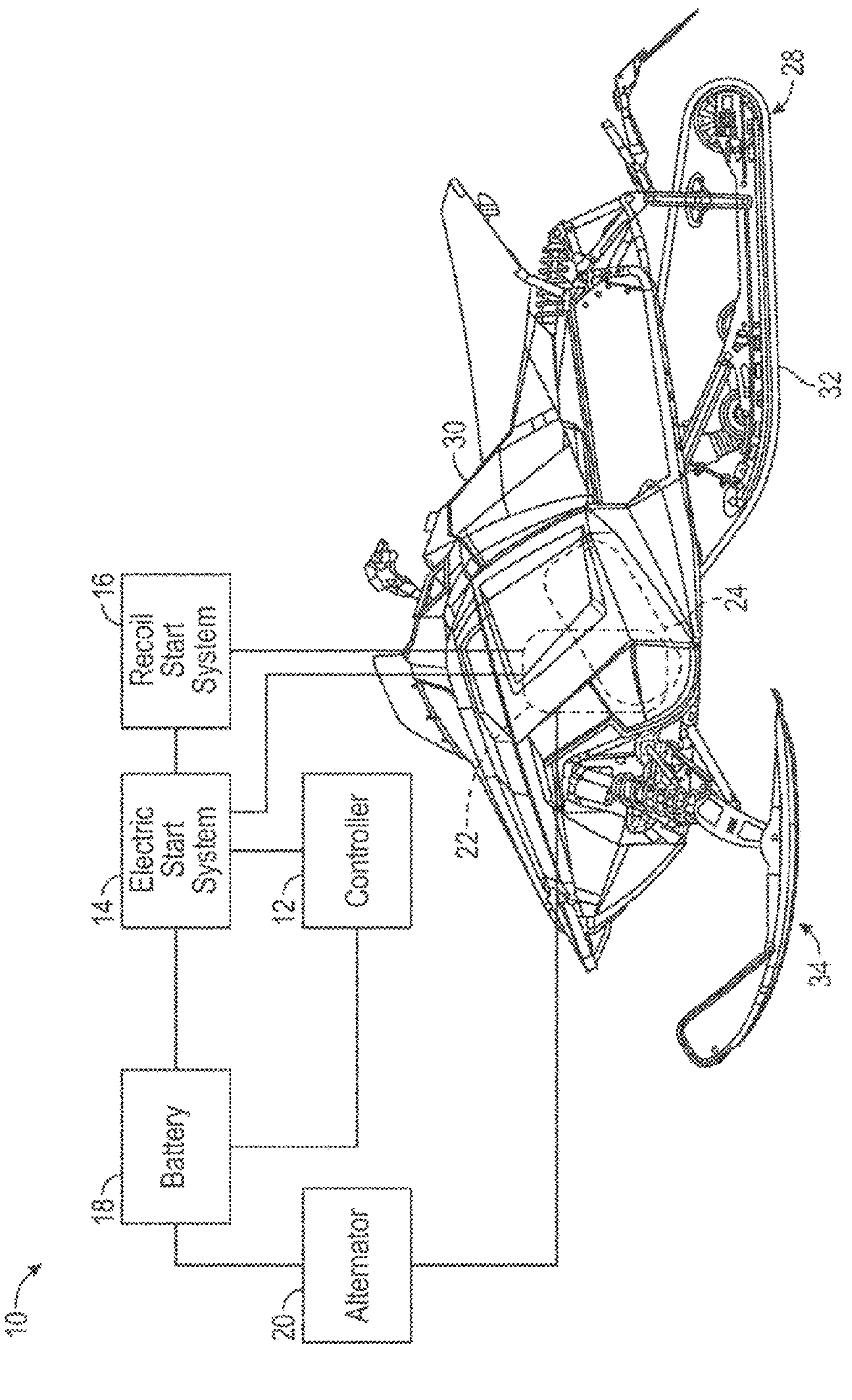
FIG. 3 is a conceptual drawing of a third vehicle.

Referring now to FIG. 3, another exemplary embodiment of a vehicle 10 is a snowmobile, which includes a controller 12, an engine 22, an electric start system 14, a start system 16, an alternator 20, a fuel source 30 (e.g., gasoline), a power source 18 (e.g., battery), a continuously variable transmission (CVT) 24, and a variety of ground engaging members 28. Exemplary ground engaging members include skis, endless tracks, wheels, and other suitable devices which support vehicle 10 relative to the ground. For example, as illustrated in FIG. 3, ground engaging members 28 include a track assembly 32 (e.g., an endless track belt) and a pair of front skis 34. The track assembly 32 supports the rear of the vehicle 10, while the skis 34 support the front of the vehicle 10. In addition, the track assembly 32 is operatively connected to the engine 22.

Optimized Crankshaft

Figure 4:
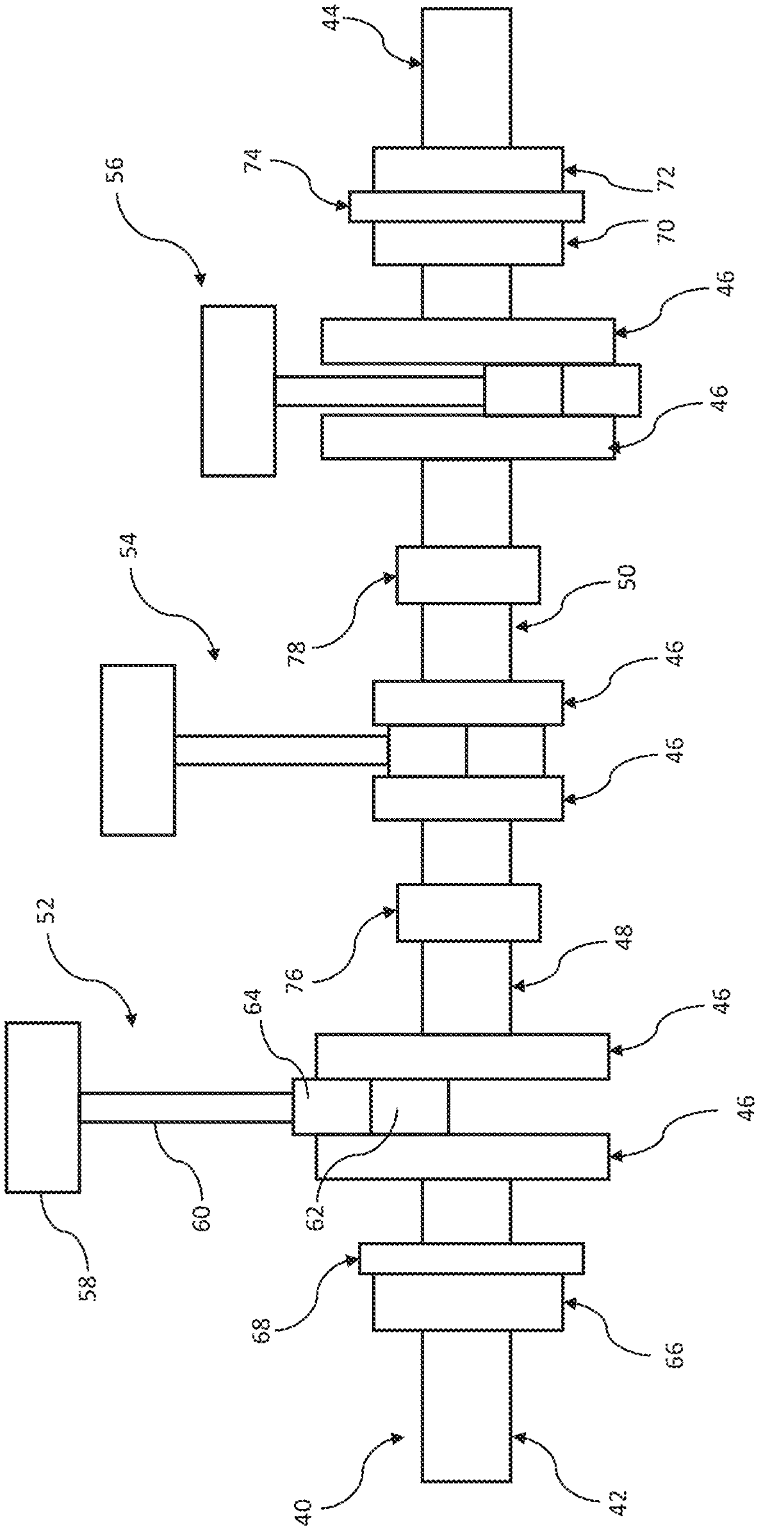
FIG. 4 is a side plan view of a crankshaft according to one embodiment of the present disclosure.

Referring now to FIG. 4, a crankshaft assembly 39 with a bearing arrangement is depicted for improving cold start behavior of the engine 22 by reducing friction. The depicted crankshaft assembly 39 includes a crankshaft 40 with a front main bearing journal 42, a rear main bearing journal 44, a plurality of connecting rod journals (hidden by the connecting rods/rod caps), a plurality of counterweights 46, and a pair of intermediate journals 48, 50. The crankshaft 40 is a conventional one-piece crankshaft for use with a 3-cylinder engine 22. In other embodiments, the crankshaft 40 may be formed from more than one piece, or may be configured to operate in an engine having fewer or more than three cylinders. The front main bearing journal 42, the rear main bearing journal 44, and the intermediate journals 48, 50 may be surface-hardened, durable metal that is wear resistant. Oil ports or drilled holes (not shown) may be variously located along the crankshaft 40 to provide lubricant to the various components.

In the depicted embodiment, the crankshaft 40 is connected to three piston assemblies 52, 54, 56 which convert the rotatory torque of the crankshaft 40 into reciprocating motion, thereby compressing a fuel/air mixture in the engine cylinders 190 (FIG. 7B) and permitting exhaust of combustion by-products during the stroke cycle of the piston assemblies 52, 54, 56. The piston assemblies 52, 54, 56 each include a piston 58, a connecting rod 60 pivotally connected to the piston 58 by a wrist pin (not shown) and a rod cap 62. The connecting rods 60 each include an enlarged end 64 which is secured to the rod cap 62 using bolts (not shown) to connect the piston assembly 52, 54, 56 to the connecting rod journals (not shown). The inner diameter formed by the enlarged end 64 and the end cap 62 is slightly larger than the diameter of the connecting rod journals, and bearing inserts between the connecting rod journals and the enlarged end 64 and end cap 62 facilitate reduced-friction rotation of the connecting rod journals as the crankshaft 40 rotates.

The depicted crankshaft arrangement also includes a ball bearing 66 disposed around the front main bearing journal 42 and a skid ring 68 also disposed around the front main bearing journal 42 adjacent the ball bearing 66. A pair of roller bearings 70, 72 are disposed around the rear main bearing journal 44 and a skid ring 74 is positioned around the rear main bearing journal 44 between the roller bearings 70, 72. In other embodiments, a single roller bearing is used. Finally, a plain bearing 76 is positioned around the intermediate bearing journal 48 between the first piston assembly 52 and the second piston assembly 54 and a plain bearing 78 is positioned around the intermediate bearing journal 50 between the second piston assembly 54 and the third piston assembly 56. In certain embodiments, the plain bearings 76, 78 are oil lubricant-based bearings without movable parts.

While a ball bearing 66 is described herein as being disposed around the front main bearing journal 42 and a pair of roller bearings 70, 72 are described as being disposed around the rear main bearing journal 44, it should be understood that the positions of these bearings (generically referred to herein as "rolling elements") may be reversed.

As opposed to certain conventional crankshaft arrangements which may use only plain bearings on the front main bearing journal 42, the rear main bearing journal 44 and the intermediate bearing journals 48, 50, the use of ball bearing 66 and roller bearings 70, 72 in the arrangement in FIG. 4 provides reduced friction, which permits easier cold starting such as in very cold environments (e.g., −40° C.) in which the lubricant may become thick. In certain embodiments, the plain bearings 76, 78 may be replaced with ball bearings or roller bearings, which may even further reduce friction, but in such embodiments the crankshaft 40 would need to be formed in multiple pieces to permit placement of the ball bearings or roller bearings onto the intermediate bearing journals 48, 50, which may make the arrangement more complicated and expensive.

It should be understood that the skid ring 38 and the skid ring 74 minimize vacuum leaks through the ball bearing 66 and the roller bearings 70, 72, respectively. As is further described herein, a vacuum is maintained in the crank chamber 252 of the crankcase 134 (FIGS. 10A and 10B) and the skid rings 68, 74 form additional seals to prevent air from entering the engine. The ball bearing 66 positioned onto the front main bearing journal 42, which is the magneto or starter end of the crankshaft 40 absorbs axial thrust and the roller bearings 70, 72 positioned onto the rear main bearing journal 44, which is the CVT end of the crankshaft 40 absorb the higher radial loads associated with the CVT and the track assembly in snowmobile applications. While the roller bearings 70, 72 could otherwise move slightly in the axial direction, the ball bearing 66 holds the crankshaft 40 in place, preventing movement in the axial direction. More specifically, since the ball bearing 66 includes an outer ring (not shown) which is set in the crankcase housing and an inner ring (not shown) fixed onto the crankshaft 40, and the balls of ball bearing 66 move within grooves formed on the outer ring and the inner ring, axial movement of the crankshaft 40 is prevented.

Integrated Starter-Generator

Figure 5:
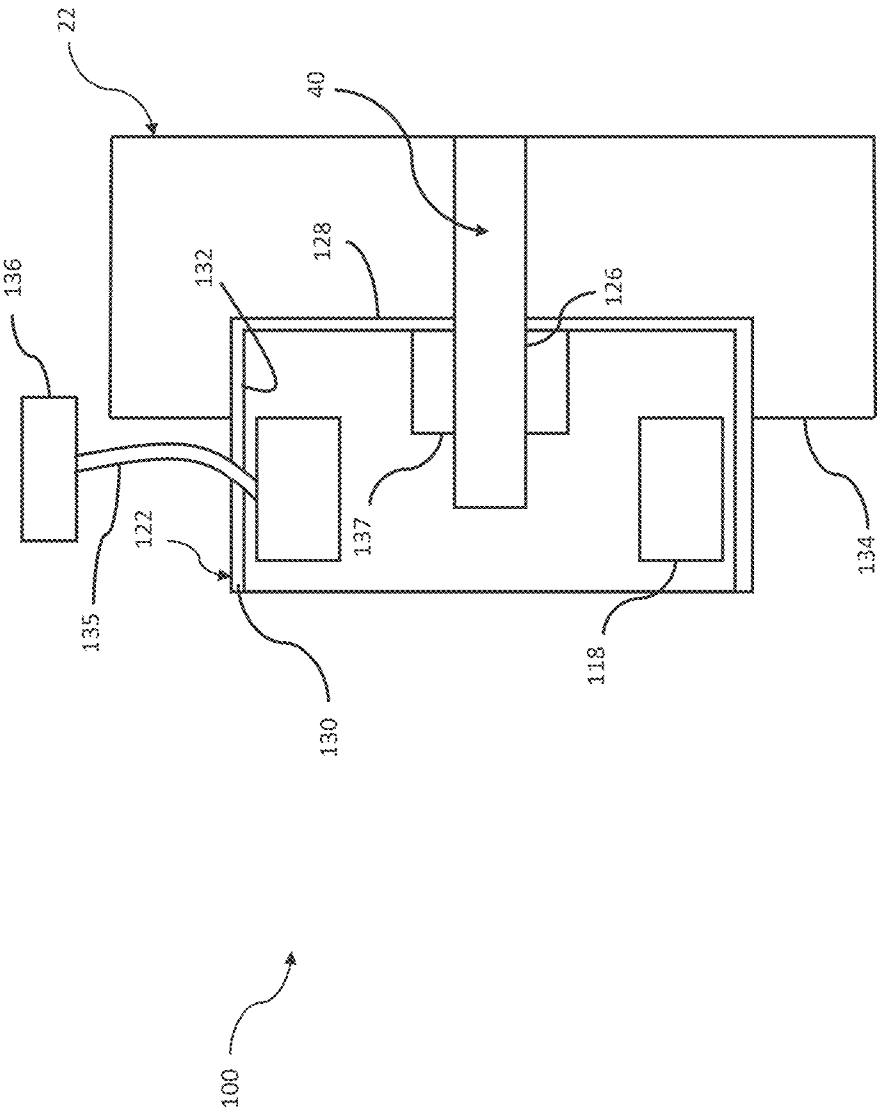
FIG. 5 is a cross-sectional view of an engine having an integrated starter-generator according to one embodiment of the present disclosure.

Referring now to FIG. 5, the integrated starter-generator 100 is shown mounted on the engine 22, according to some embodiments of the present disclosure. The starter-generator 100 is configured for operation with a four-stroke engine 22. FIG. 5 illustrates the starter-generator 100 including a magneto flywheel 122, the stator 118 and a stator cover (not shown). According to the illustrated embodiment, the flywheel 122 includes a central bore 126 for direct coupling with the crankshaft 40 of the engine 22. The flywheel 122 further includes a disk 128 surrounding the central bore 126 and an annular wall 130, having a magnetized inner surface 132, extending from a periphery of disk 128 in a cup-like fashion to surround the stator 118. The stator cover (not shown) is mounted to the crankcase 134 of engine 22 and serves to protect the starter-generator 100 from environmental elements such as, for example, mud and water in the case of snowmobiles.

The stator 118 includes a plurality of pole portions, i.e. radially extending protrusions equally spaced about a periphery of stator; those skilled in the art will appreciate that stator coils or windings are wound about salient pole portions and a wire bundle 135 electrically couples the coils or windings to the ECM 120 and a power source via a connector 136.

As shown, the flywheel 122 is mounted on the crankshaft 40, which extends from the crankcase 134 and is supported by a bearing 137; the flywheel 122 is oriented such that the disk 128 of the flywheel 122, positioned between the stator 118 and the crankcase 134, is in close proximity to the crank bearing 137, thus reducing a bending moment on the crankshaft 40 and minimizing a load on the crank bearing 137.

FIG. 5 further illustrates stator 118 surrounded by a magnetized inner surface 132 of the annular wall 130 of the flywheel 122; according to some embodiments of the present disclosure, windings or coils of the stator 118 and poles, N and S, of the magnetized inner surface 132 may be configured in accordance with embodiments described in U.S. Pat. No. 6,392,311, which is incorporated by reference herein. According to the illustrated embodiment, the stator 118 is coaxially disposed within the annular wall 130 of the flywheel 122 such that the magnetized inner surface 132 is rotatably disposed adjacent the stator coils. When the operator activates the starter-generator 100 to start the engine 22, a power source energizes the stator 118 via the wire bundle 135, via current passing through the coils of the stator 118, and causes the magneto flywheel 122 to spin and thus bring the crankshaft 40 up to an operable speed so that the engine combustion process can start. Once the engine 22 is running, the starter-generator 100 is utilized as a generator, wherein the magneto flywheel 122 induces current flow in the windings of the stator 118, which current flow may be supplied to charge the power source 18 and power vehicle components.

Integrated Thermostat

Figure 6B:
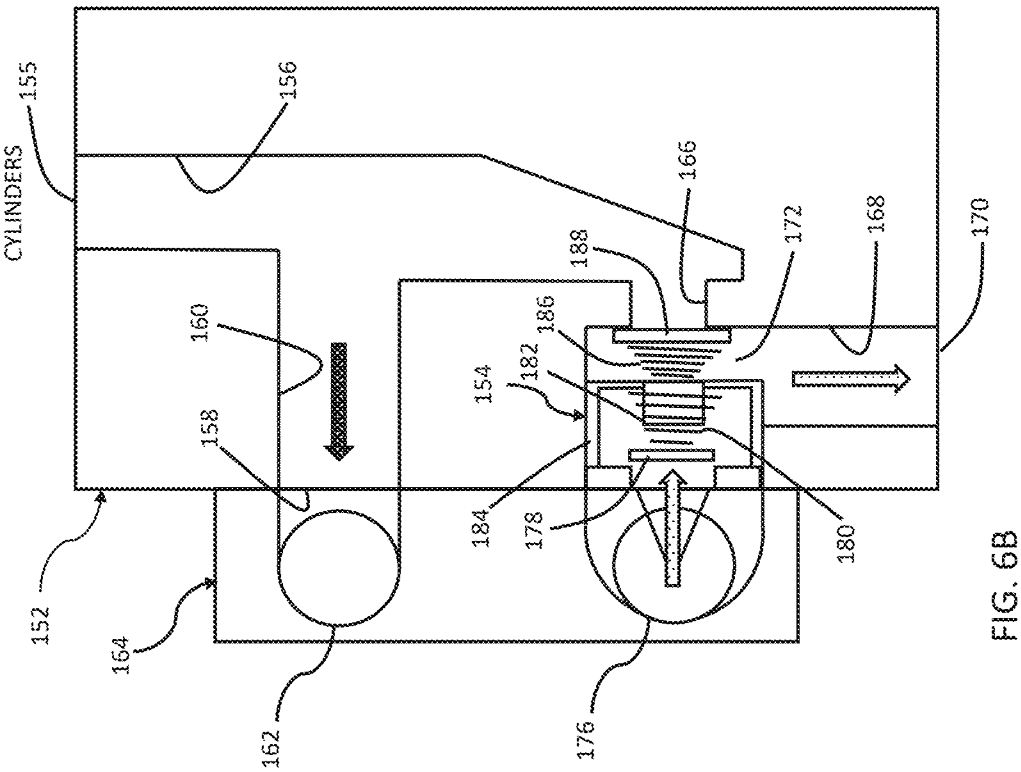
FIG. 6B is a cross-sectional view of portions of the engine shown in FIG. 6A with the integrated thermostat depicted in a second position.
Figure 6A:
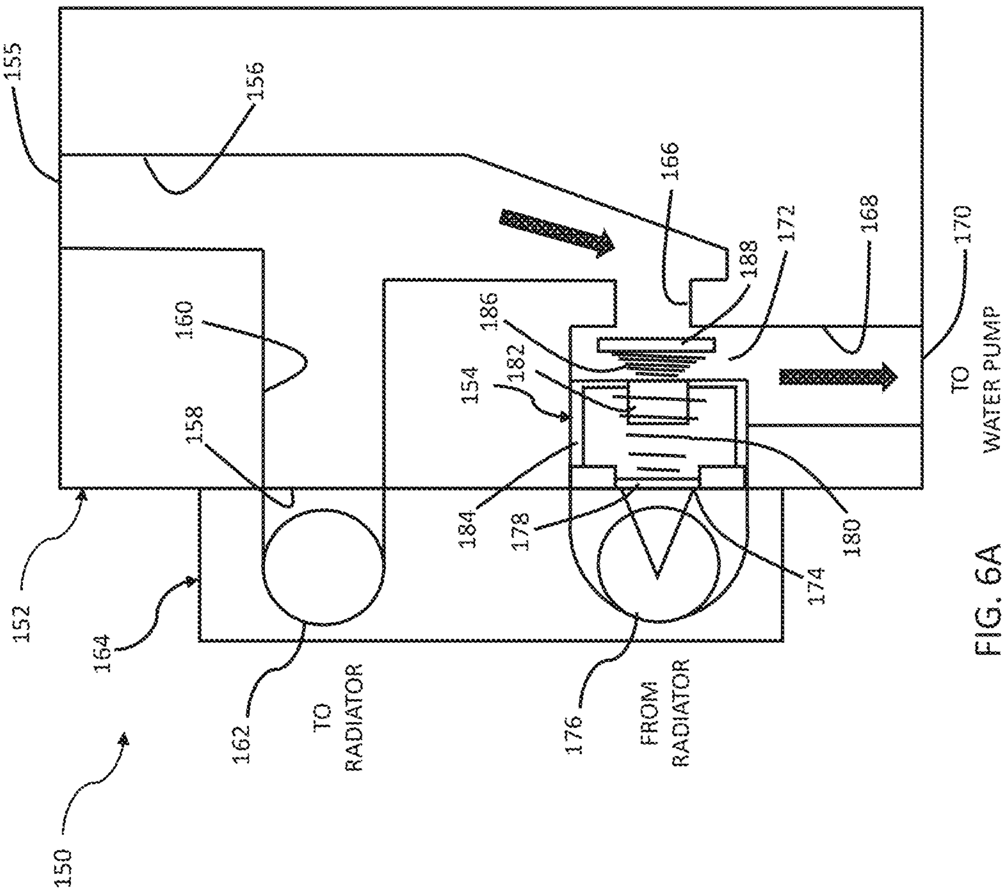
FIG. 6A is a cross-sectional view of portions of an engine having an integrated thermostat according to one embodiment of the present disclosure depicted in a first position.

Referring now to FIGS. 6A and 6B, a thermostat configuration 150 is shown with a thermostat 154 integrated into the cylinder head 152 of the engine 22. By integrating the thermostat 154 directly into the cylinder head 152, the thermostat configuration 150 may allow for the use of fewer and simpler parts and provide better temperature control of the engine 22 as is further described below. This may permit easier packaging as compared to conventional configurations. The thermostat 154 functions as a temperature controlled, continuous analog control valve. In other embodiments, the thermostat 154 may be electrically controlled.

As shown, the cylinder head 152 includes a main return inlet 155 in flow communication with a main return path 156 that routes hot coolant (e.g., water) from the cylinders 190 (FIG. 7B) of the engine 22 and other portions of the cylinder head 152. The cylinder head 152 further includes a radiator outlet 158 in flow communication with a radiator return path 160 which is in flow communication with the main return path 156. The radiator outlet 158 is further in flow communication with a radiator return conduit 162 formed as part of a tube cover 164 mounted to the cylinder head 152. The radiator return conduit 162 is in flow communication with a radiator hose (not shown) that routes hot coolant from the cylinder head 152 to the radiator (not shown) for cooling. The cylinder head 152 further includes a bypass opening 166 that is in flow communication with the main return path 156. As is further described herein, in cold start conditions or whenever the engine 22 is sufficiently cold, the bypass opening 166 is in flow communication with a water pump return path 168 (when the thermostat 154 is opened as depicted in FIG. 6A) which is connected to a water pump outlet 170 that routes coolant from the cylinder head 152 to the water pump 200 (FIGS. 7A and 7B) of the engine 22. The thermostat 154 is positioned within a thermostat chamber 172 formed within the cylinder head 152 to control the flow of coolant through the bypass opening 166 and into the water pump return path 168. The thermostat chamber 172 is also in flow communication with a radiator inlet 174 which is in flow communication with a radiator inlet conduit 176 formed as part of the tube cover 164. The radiator inlet conduit 176 receives coolant from the radiator that has been cooled. As is further described herein, cooled coolant from the radiator is routed through the thermostat 154, the thermostat chamber 172, the water pump return path 168 and the water pump opening 170 after the engine 22 has warmed sufficiently that the coolant from the radiator causes the thermostat 154 to at least partially close the bypass opening 166.

The thermostat 154 generally includes first valve plate 178, a first spring 180, a temperature sensitive element 182, a mounting bracket 184, a second spring 186 and a second valve plate 188. The temperature sensitive element 182 causes the first valve plate 178 and the second valve plate 188 to move together between opened and closed positions depending upon the temperature of the coolant in the thermostat chamber 172 from the radiator inlet 174 and/or the bypass opening 166.

The first valve plate 178 is movable between a closed position (as shown in FIG. 6A) where the first valve plate 178 is seated against the radiator inlet 174 to prevent coolant from flowing from the radiator (not shown) through the radiator inlet 174 into the thermostat chamber 172 and an opened position (as shown in FIG. 6B) wherein the first valve plate 178 is positioned away from the radiator inlet 174 to permit coolant to flow through the radiator inlet 174 and into the thermostat chamber 172. The first valve plate 178 is biased toward the closed position by the first spring 180. Similarly, the second valve plate 188 is movable between a closed position (shown in FIG. 6B) where the second valve plate 188 is seated against the bypass opening 166 to prevent coolant from flowing from the cylinders 190 through the main return inlet 155 and the main return path 156 into the thermostat chamber 172 and an opened position (as shown in FIG. 6A) wherein the second valve plate 188 is positioned away from the bypass opening 166 to permit coolant to flow through the bypass opening 166 into the thermostat chamber 172. The second valve plate 188 is biased toward the closed position by the second spring 186.

In operation after a cold start, the temperature sensitive element 182 of the thermostat 154 causes the first valve plate 178 to be positioned in the closed position to seal off the radiator inlet 174 and the second valve plate 188 to be positioned in an opened position to permit warm coolant to flow from the cylinders 190 and cylinder head 152, through the thermostat chamber 172 and out the water pump opening 170 to the water pump 200 to be recirculated to the cylinders 190 and the cylinder head 152. This permits the engine 22 to warm more quickly, which in turn increases lubricant flow and reduces friction. As the engine 22 warms, the temperature sensitive element 182 causes the first valve plate 178 and the second valve plate 188 to move to the right as viewed in the figures. In doing so, the loop of reduced temperature coolant flow from the radiator (not shown) is gradually opened and the loop of warmer coolant flow from the cylinders is gradually reduced. It should be noted that the second valve plate 188 will normally not be entirely closed as shown in FIG. 6B as this would require all coolant to flow through the radiator. In the manner described above, the temperature of the coolant and therefor the engine 22 may be precisely controlled.

Simplified Water System

Figure 7B:
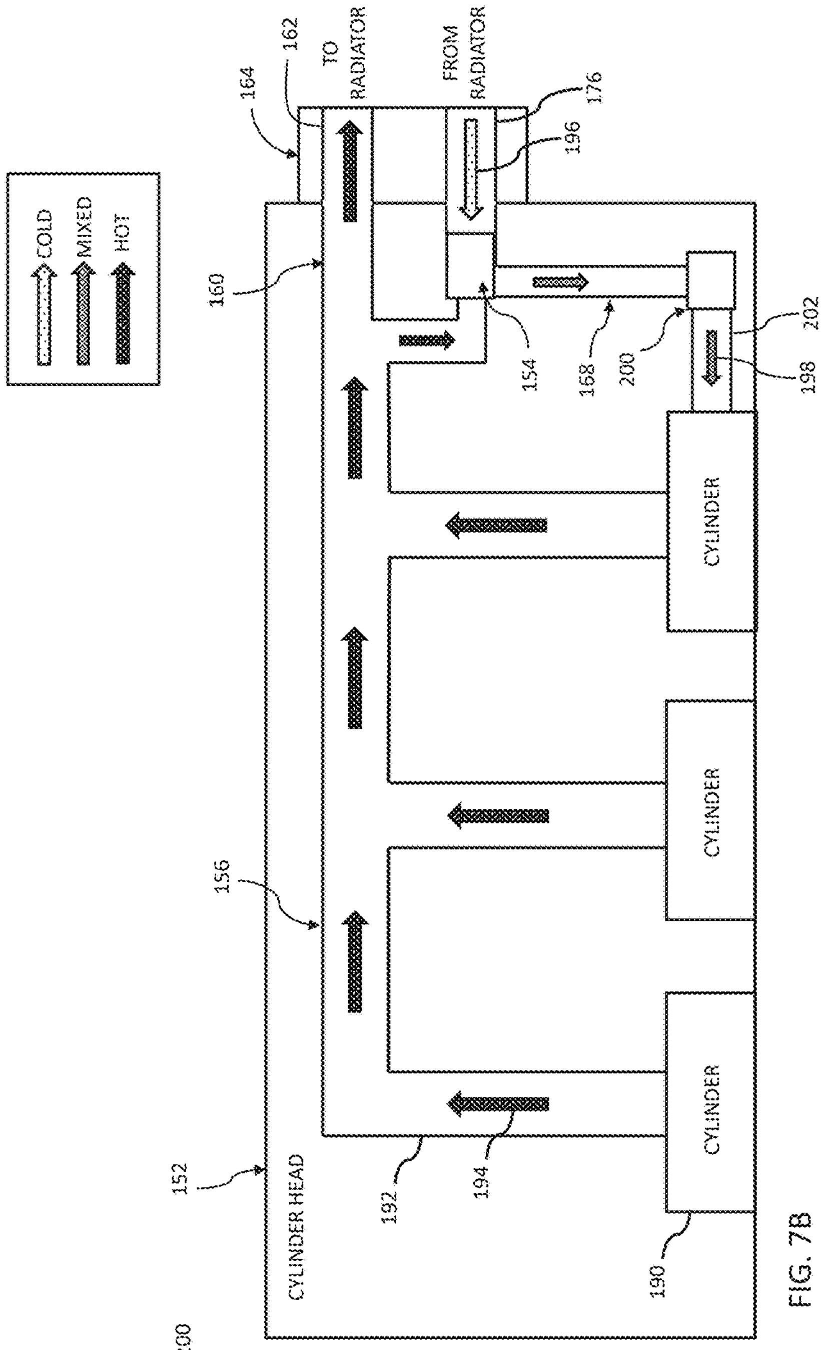
FIG. 7B is a cross-sectional view of portions of the engine shown in FIG. 7A.
Figure 7A:
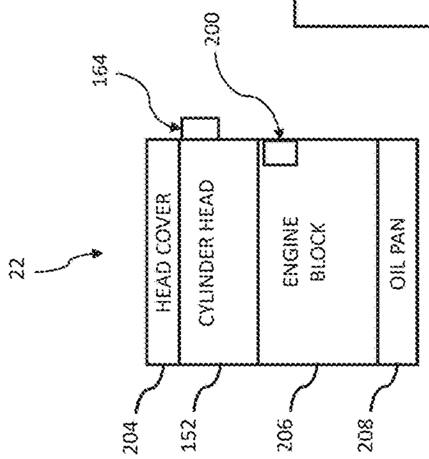
FIG. 7A is a conceptual side view of an engine having an integrated water system according to one embodiment of the present disclosure.

Referring now to FIGS. 7A and 7B, a further depiction of the thermostat configuration 150 of FIGS. 6A and 6B is shown. FIG. 7B shows the flow of coolant from the cylinders 190 through passageways 192 formed in the cylinder head 152 to the main return path 156 where it is routed to the thermostat 154 and the radiator (not shown) through the radiator return path 160 and the radiator outlet 158. FIG. 7B also shows the flow of coolant out the radiator return conduit 162 of the tube cover 164 and in from the radiator (not shown) through the radiator inlet conduit 176 of the tube cover 164. The arrows 194 represent hot coolant from the cylinders 190. The arrows 196 represent cold coolant from the radiator (not shown). The arrows 198 represent coolant that is a mixture of hot coolant and cold coolant as a result of mixing in the thermostat chamber 172 via the operation of the thermostat 154 as described above. As shown in FIG. 7B, the mixed coolant 198 is routed through the water pump return path 168, which is formed in the cylinder head 152, to the water pump 200, which is integrated into the magneto cover (not shown). The water pump 200 then pumps the mixed coolant 198 to the cylinders 190 through coolant passageways 202 formed in the cylinder head 152.

Referring now to FIG. 7A, the engine 22 is depicted with a head cover 204 attached to the cylinder head 152, which is attached to an engine block 206 having an oil pan 208 positioned below the engine block 206. The tube cover 164 is shown attached to the cylinder head 152 as described above and the water pump 200 is shown integrated into the engine block 206. It should be understood that the tube cover 164 may be bolted or otherwise attached to the cylinder head 152 at a position toward the front of the engine 22 or a position toward the rear of the engine 22. The positioning of the tube cover 164 is flexible to accommodate different models of the vehicle 10, which may have the coolers located near the front or the rear of the engine 22.

The configuration described herein for use with a 4-stroke, 3-cylinder engine 22 provides a simplified and integrated water routing system and improves packaging and temperature control of the engine 22. The thermostat 154 is integrated into the cylinder head 152 and all the coolant lines are integrated into the cylinder head 152 and the engine block 206, which permits the use of fewer parts with reduced complexity. The above-described configuration also reduces the need for routing hoses to the various components. The configuration only requires one hose routed to the radiator (not shown) and one hose routed from the radiator.

Oil Tank Breathing System

Figure 8:
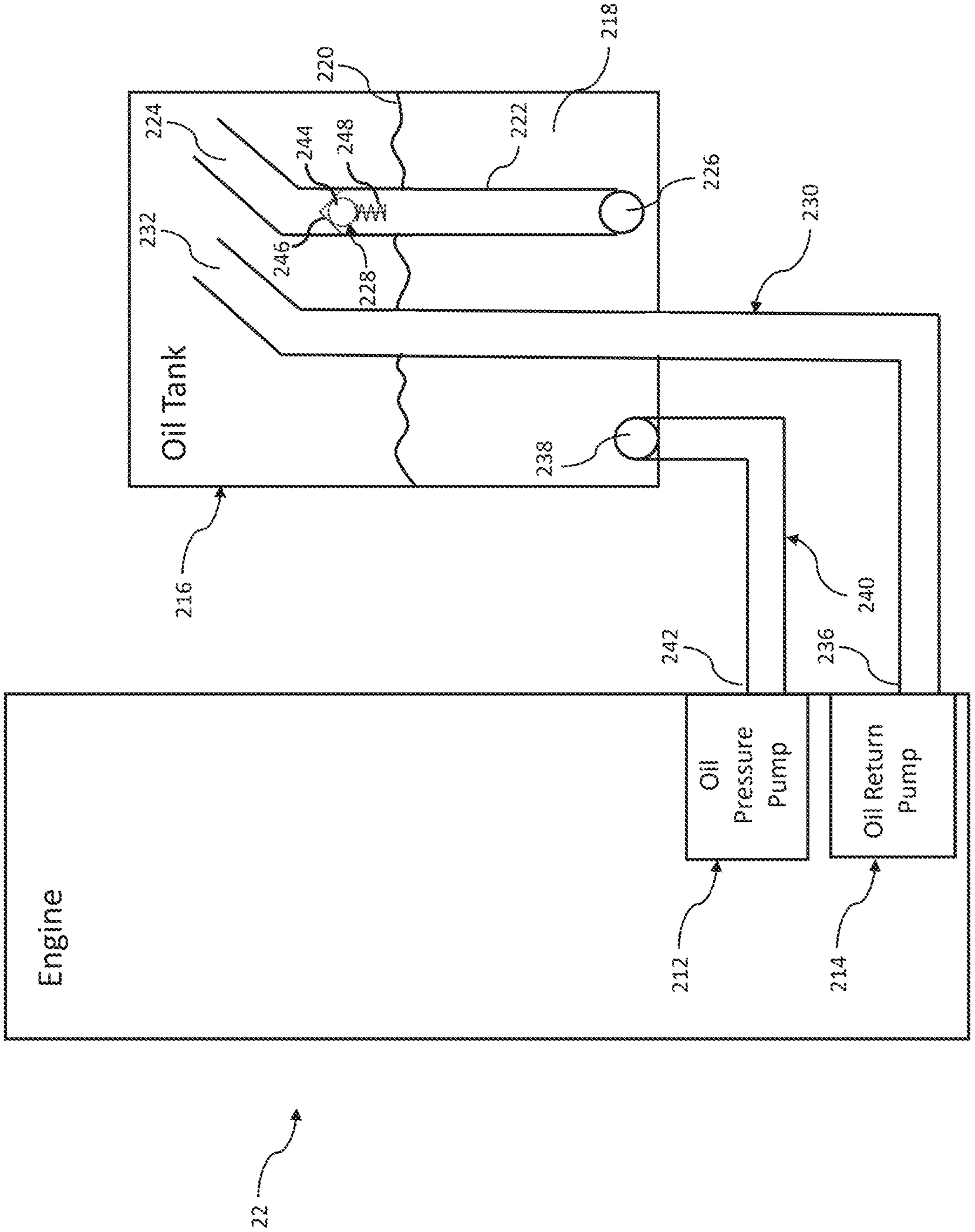
FIG. 8 is a conceptual side view of an engine connected to an oil tank having an oil tank breathing system according to one embodiment of the present disclosure.

Referring now to FIG. 8, an oil tank breathing system 210 according to the present disclosure is shown. As shown, the engine 22 includes an oil pressure pump 212 and an oil return pump 214. The oil tank 216 defines an internal volume that contains oil 218 having an upper surface or oil level 220. The oil tank 216 also includes a breather line 222 having an opening 224 at one end and an outlet port 226 at the other end which is opened to atmosphere. A reed valve 228 is positioned in the breather line 222 as is further described below. The oil tank 216 also includes an oil return line 230 with an opening 232 at one end 234. The oil return line 230 is connected to the oil return pump 214 at the other end 236. Finally, an oil outlet port 238 of the oil tank 216 is in fluid communication with an oil outlet line 240 connected at the other end 242 to the oil pressure pump 212 of the engine 22.

The reed valve 228 is depicted as including a movable portion 244 that seats against an inlet 246. The movable portion 244 is biased toward the inlet 246 by a spring portion 248 such that flow is prevented in the upward direction as viewed in the figure. The reed valve 228 is added in the breather line 222 for the evacuation of the oil tank 216 and prevention of emptying of the oil tank 216 when the engine 22 is standing still. This prevents the oil 218 from flowing into the crankcase (not shown) and filling it, which would reduce cold start performance of the engine 22. The one-way operation of the reed valve 228 prevents air from flowing from the atmosphere through the outlet port 226 into the oil tank 216. This holds the oil 218 in the oil tank 216 with a vacuum when the engine 22 is standing still.

Oil 218 normally flows from the oil outlet port 238 through the oil outlet line 240 to the oil pressure pump 212. The oil return pump 214 pumps oil 218 from the engine 22 through the oil return line 230 into the oil tank 216. The opening 232 of the oil return line 230 is positioned to be above the oil level 220 when the engine 22 is running, but it is possible for the vehicle 10 to be tipped over with the engine not running. The breather line 222 is, as described above, not fully opened which, when the engine 22 is standing still, may permit oil 218 to drip into the crankcase 134. When the engine 22 is running, the reed valve 228 is pulled to the opened position by the vacuum generated by the engine 22, but when the engine 22 is not running the reed valve 228 prevents oil 218 from flowing out of the oil tank 216.

It should be understood that while a reed valve 228 is described herein, various other types of one-way valves may be used. Any suitable valve that prevents oil 218 from flowing out to the air filter or flowing backward when the engine 22 is stopped and the vehicle 10 is upright is suitable.

Integrated Breather System

Figure 9:
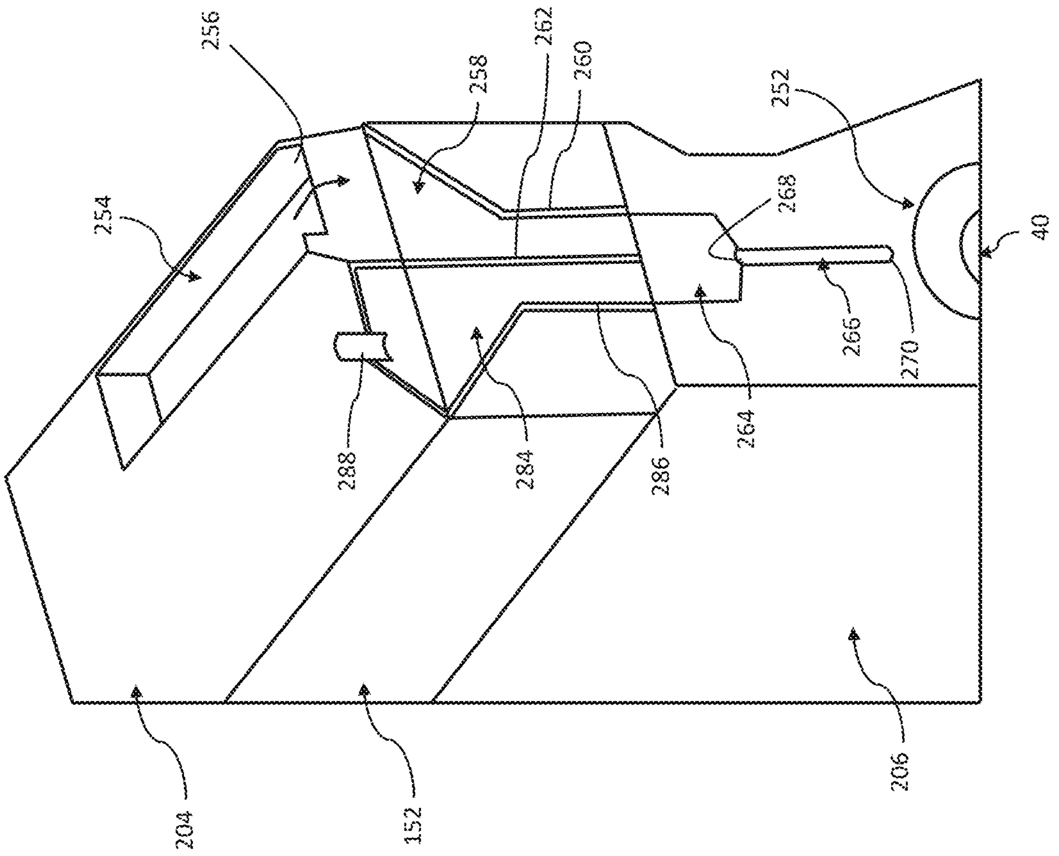
FIG. 9 is a perspective, cross-sectional view of an engine having an integrated breather system according to one embodiment of the present disclosure.

Referring now to FIGS. 9, 10A, 10B, 11A and 11B, an integrated breather system 250 for a 4-stroke, 3-cylinder engine 22 is shown. As shown in FIG. 9, the engine 22 includes a head cover 204 mounted to the cylinder head 152, which is mounted to the engine block 206 having a crank chamber 252 housing the crankshaft 40. The integrated breather system 250 includes a labyrinth 254 integrated into the head cover 204. The labyrinth 254 includes a pass through opening 256 which directs air and oil downwardly through a siphon inlet 258 which is bounded by an outer wall 260 and a central wall 262. The siphon inlet 258 is in flow communication with a siphon 264 which is configured to permit oil to be drawn into the crank chamber 252 and air to be released to an air box (not shown) as is further described below. The siphon 264 is in flow communication with an oil return tube 266 formed in the engine block 206.

Figure 10B:
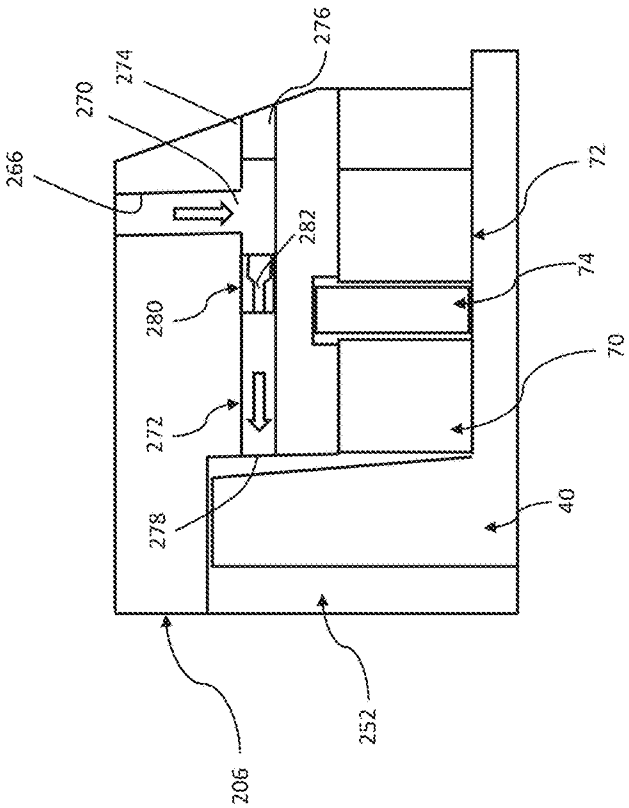
FIG. 10B is a side, cross-sectional view of a portion of the engine shown in FIG. 9.
Figure 10A:
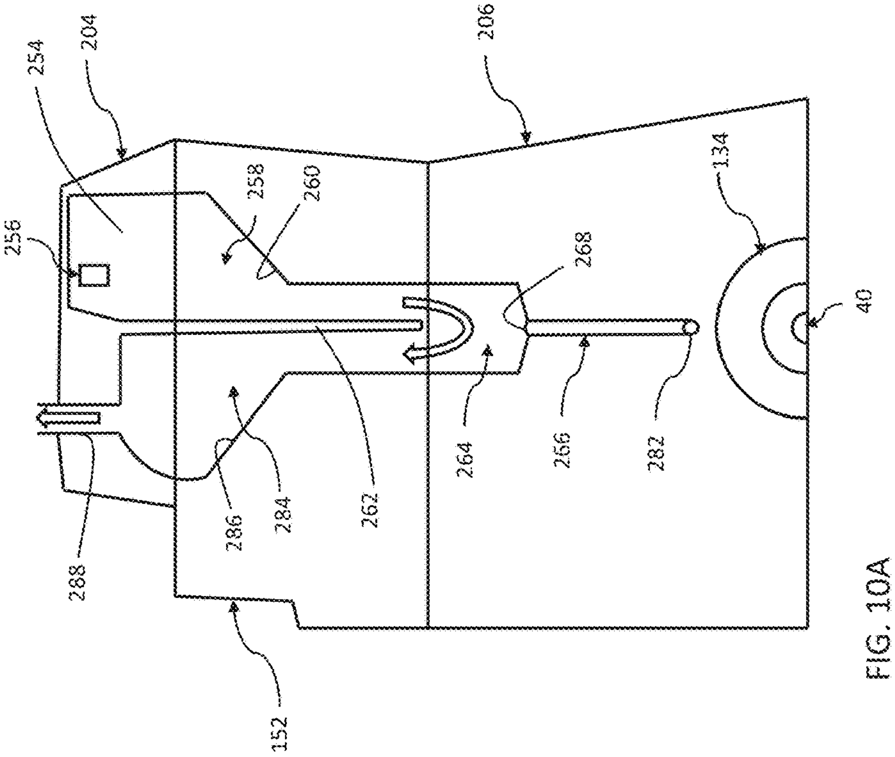
FIG. 10A is a side, cross-sectional view of the engine shown in FIG. 9.

As best shown in FIG. 10B, the oil return tube 266 includes an inlet opening 268 in flow communication with the siphon 264 and an outlet opening 270 in flow communication with an oil delivery bore 272. The oil delivery bore 272 includes a first opening 274 which is plugged with a plug 276 and a second opening 278 which is in flow communication with the crank chamber 252. A restrictor 280 is fitted into the oil delivery bore 272 and includes a central orifice 282 which in certain embodiments may be approximately 1.5 mm. In other embodiments, the size of the central orifice 282 may be greater than or less than 1.5 mm. FIG. 10B also depicts the crankshaft 40, the roller bearings 70, 72 and the skid ring 74 mounted on the rear main bearing journal 44 of the crankshaft 40.

The siphon 264 is also in flow communication with a siphon outlet 284 which is bounded by an outer wall 286 and the central wall 262. The siphon outlet 284 is in flow communication with a breather outlet 288 which releases air that has passed through the siphon inlet 258, the siphon 264 and the siphon outlet 284.

Figure 11B:
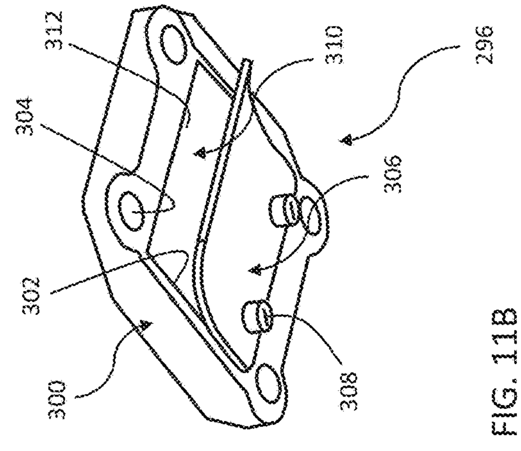
FIG. 11B is a perspective view of the reed valve shown in FIG. 11A.
Figure 11A:
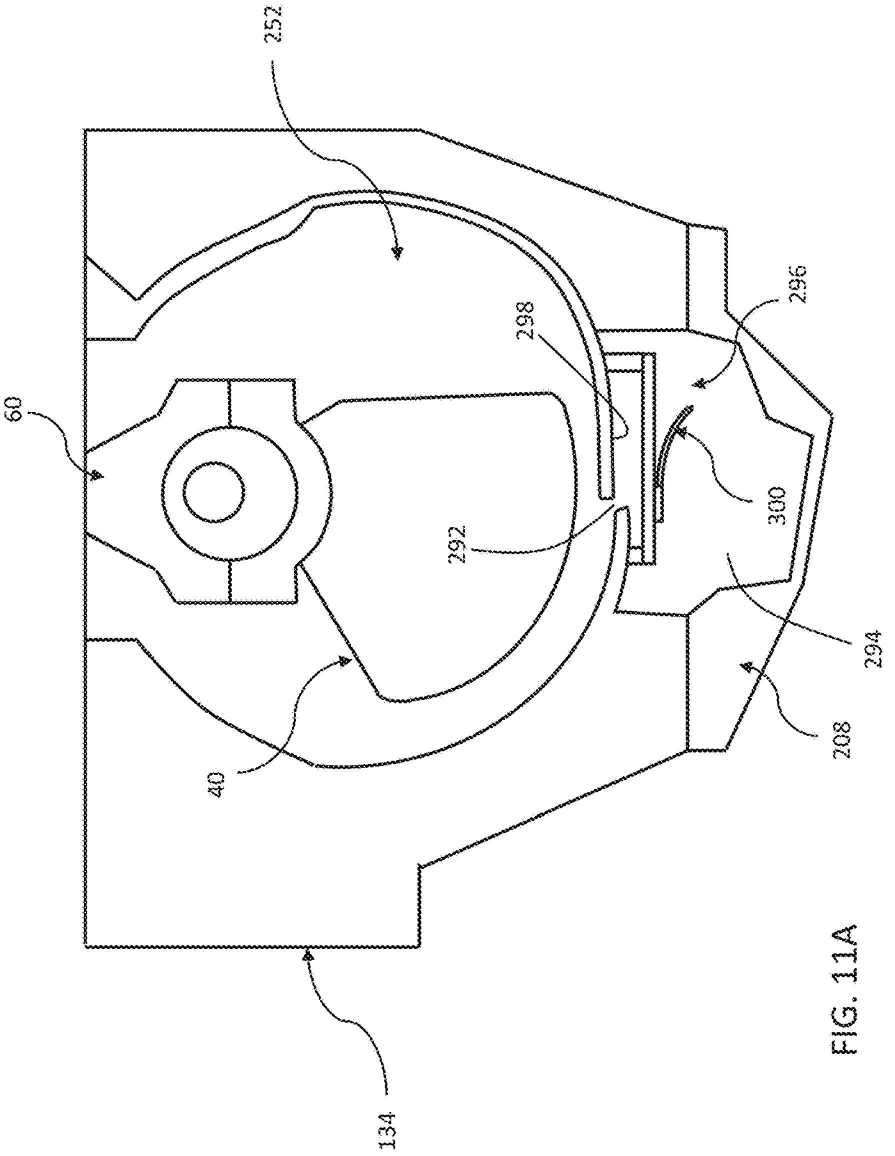
FIG. 11A is an end, cross-sectional view of a portion of the engine shown in FIG. 9.

Referring now to FIGS. 11A and 11B, the crankcase 134 is shown with the oil pan 208 attached. The crank chamber 252 of the crankcase 134 includes a lower opening 292 which is in flow communication with an inner volume 294 of the oil pan 208. One or more reed valves 296 are coupled to a lower wall 298 of the crankcase 134 adjacent the lower opening 290. The reed valve 296 includes a body 300 having a central opening 302 and a plurality of mounting bores 304 (four shown) which align with corresponding bores (not shown) in the lower surface of the lower wall 298 to permit attachment of the reed valve 296 to the lower wall 298 using fasteners such as bolts (not shown). The reed valve 296 further includes a stop 306 attached to the body 300 by fasteners 308, and a flap 310 with one end (not shown) attached to the body 300 and a free end 312. The flap 310 is movable between a closed position, as shown in FIG. 11B where the free end 312 is engaged with the body 300 to close the central opening 302, and an opened position where the free end 312 is engaged with the stop 306 to open the central opening 302.

When the engine 22 is operating, a vacuum is generated in the crank chamber 252, which moves the flap 310 to the closed position after each cycle, thereby maintaining the vacuum. In this manner, the oil that passes through the labyrinth 254 into the siphon 264 is drawn into the crank chamber 252 through the oil return tube 266 and the oil delivery bore 272. Consequently, the engine 22 may be tilted in a manner corresponding to common drive angles while still not losing oil into the breather system. Any air that enters the siphon 264 travels up through the siphon outlet 284 and is returned to the airbox (not shown) through the breather outlet 288.

As should be apparent from the foregoing, the labyrinth 254 is directly integrated into the head cover 204 and the siphon 264 is integrated into the cylinder head 152 and the engine block 206. In this manner, any vapor or condensate drawn into the siphon 264 is unlikely to freeze and block the flow of oil in cold conditions because the siphon 264 is heated by the engine block 206 and the cylinder head 152. The integration of the components of the integrated breather system 250 simplifies the design and permits improved packaging.

Any directional references used with respect to any of the figures, such as right or left, up or down, or top or bottom, are intended for convenience of description, and do not limit the present disclosure or any of its components to any particular positional or spatial orientation. Additionally, any reference to rotation in a clockwise direction or a counter-clockwise direction is simply illustrative. Any such rotation may be implemented in the reverse direction as that described herein.

Although the foregoing text sets forth a detailed description of embodiments of the disclosure, it should be understood that the legal scope of the invention is defined by the words of the claims set forth at the end of this patent and equivalents. The detailed description is to be construed as exemplary only and does not describe every possible embodiment. Numerous alternative embodiments may be implemented, using either current technology or technology developed after the filing date of this patent, which would still fall within the scope of the claims.

The following additional considerations apply to the foregoing description. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Unless specifically stated otherwise, use herein of words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Additionally, some embodiments may be described using the expression "communicatively coupled," which may mean (a) integrated into a single housing, (b) coupled using wires, or (c) coupled wirelessly (i.e., passing data/commands back and forth wirelessly) in various embodiments.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112 (f) unless traditional means-plus-function language is expressly recited, such as “means for” or “step for” language being explicitly recited in the claim(s). The following clauses illustrate example subject matter described herein:

Clause 1: A crankshaft assembly, comprising: a one-piece crankshaft having a front main bearing journal, a rear main bearing journal, and a plurality of intermediate journals positioned between a plurality of piston assemblies; a first rolling element mounted to the front main bearing journal; a second rolling element mounted to the rear main bearing journal; and a plurality of plain bearings mounted to the plurality of intermediate journals.

Clause 2: The crankshaft assembly of clause 1, further comprising a first skid ring mounted to the front main bearing journal adjacent the first rolling element and a second skid ring mounted to the rear main bearing journal adjacent the second rolling element.

Clause 3: The crankshaft assembly of clause 1 or 2, further comprising a third rolling element mounted to the rear main bearing journal.

Clause 4: The crankshaft assembly of clause 3, further comprising a first skid ring mounted to the front main bearing journal adjacent the first rolling element and a second skid ring mounted to the rear main bearing journal between the second rolling element and the third rolling element.

Clause 5: The crankshaft assembly of any of the preceding clauses, wherein the first rolling element is a ball bearing and the second rolling element is a roller bearing.

Clause 6: An integrated starter-generator for a 4-stroke 3-cylinder engine, comprising: a flywheel including a disk surrounding a central bore configured to receive a crankshaft of the engine and an annular wall extending from a periphery of the disk, the annular wall having a magnetized inner surface; and a stator coaxially disposed within the annular wall of the flywheel, the stator includes a plurality of coils; wherein upon activation of the integrated starter-generator to start the engine, the plurality of coils are energized to cause the flywheel to rotate, thereby rotating the crankshaft; and wherein during operation of the engine, rotation of the flywheel induces current flow in the plurality of coils.

Clause 7: A thermostat configuration, comprising: a main return path formed in a cylinder head of an engine and configured to receive coolant from cylinders of the engine; a radiator return path formed in the cylinder head and in flow communication with the main return path, the radiator return path also in flow communication with a radiator outlet configured to deliver coolant to a radiator of the engine; a thermostat chamber formed in the cylinder head, the thermostat chamber being in flow communication with a radiator inlet configured to receive coolant from the radiator, a bypass opening configured to receive coolant from the main return path, and a water pump return path configured to deliver coolant to a water pump of the engine; and a thermostat positioned in the thermostat chamber including a first valve plate, a second valve plate and a temperature sensitive element which causes the first valve plate and the second valve plate to move together between opened and closed positions depending upon a temperature of the coolant in the thermostat chamber.

Clause 8: The thermostat configuration of clause 7, further comprising a tube cover mounted to the cylinder head, the tube cover including a radiator return conduit positioned to receive coolant from the radiator outlet and a radiator inlet conduit positioned to deliver coolant from the radiator to the radiator inlet.

Clause 9: The thermostat configuration of clauses 6 or 7, wherein the first valve plate is movable between a closed position wherein the first valve plate is seated against the radiator inlet to prevent coolant from flowing from the radiator into the thermostat chamber and an opened position wherein the first valve plate is spaced apart from the radiator inlet to permit coolant to flow from the radiator into the thermostat chamber.

Clause 10: The thermostat configuration of clause 8, wherein the thermostat further includes a first spring positioned to bias the first valve plate toward the closed position.

Clause 11: The thermostat configuration of any one of clauses 6 through 9, wherein the second valve plate is movable between a closed position wherein the second valve plate is seated against the bypass opening to prevent coolant from flowing from the main return path into the thermostat chamber and an opened position wherein the second valve plate is spaced apart from the bypass opening to permit coolant to flow from the main return path into the thermostat chamber.

Clause 12: A water system for a 4-stroke 3-cylinder engine, comprising: a cylinder head including a plurality of cylinders, a plurality of passageways in flow communication with the plurality of cylinders, a main return path in flow communication with the plurality of passageways, a radiator return path in flow communication with the main return path, a thermostat chamber, a water pump return path in flow communication with the thermostat chamber, a water pump in flow communication with the water pump return path, and a plurality of coolant passageways in flow communication with the plurality of cylinders; and a thermostat positioned within the thermostat chamber and configured to control a flow of coolant to the water pump based upon a temperature of coolant in the main return path.

Clause 13: The water system of clause 11, further comprising a tube cover mounted to the cylinder head and including a radiator return conduit in flow communication with the radiator return path to deliver coolant to a radiator and a radiator inlet conduit in flow communication with the thermostat chamber to deliver coolant from the radiator to the thermostat chamber.

Clause 14: An oil tank breathing system, comprising: an oil pressure pump; an oil return pump; an oil tank defining an internal volume; a breather line positioned in the oil tank and having an opening at one end within the internal volume and an outlet port at another end; an oil return line extending into the oil tank, the oil return line having a first opening at one end within the internal volume and a second opening in flow communication with the oil return pump to return oil to the oil tank; an oil outlet line in flow communication with an oil outlet port of the oil tank and the oil pressure pump to remove oil from the oil tank; and a valve positioned in the breather line, the valve having a movable portion that is biased by a spring portion toward a closed positioned wherein the movable portion is seated against an inlet of the valve to prevent oil from flowing out of the oil tank through the breather line.

Clause 15: An integrated breather system for an engine, comprising: a labyrinth integrated into a head cover of the engine including a pass through opening which directs air and oil to a siphon inlet formed in the engine; a breather outlet integrated into the head cover in flow communication with a siphon outlet formed in the engine; a siphon integrated into the engine in flow communication with the siphon inlet, the siphon outlet and an oil return tube which delivers oil from the siphon to a crank chamber of the engine in response to a vacuum in the crank chamber, the siphon outlet releasing air from the siphon to an airbox through the breather outlet.

Clause 16: The integrated breather system of clause 14, wherein the oil return tube is in flow communication with an oil delivery bore which is in flow communication with the crank chamber, the oil delivery bore including a restrictor with a central orifice that restricts the flow of oil.

Clause 17: The integrated breather system of clauses 14 or 15, further including a valve mounted to a lower wall of a crankcase of the engine to control a flow of oil through a lower opening of the lower wall into an oil pan mounted to the crankcase, the valve being movable between a closed position in response to a vacuum in the crank chamber to maintain the vacuum in the crank chamber and an opened position in response to an absence of the vacuum in the crank chamber to permit oil the flow of oil through the lower opening.

Clause 18: The integrated breather system of clause 16, wherein the valve is a reed valve having a flap that is movable between the closed position and the opened position.

What is claimed is:

1. A thermostat configuration, comprising:

a main return path formed in a cylinder head of an engine and configured to receive coolant from cylinders of the engine;

a radiator return path formed in the cylinder head and in flow communication with the main return path, the radiator return path also in flow communication with a radiator outlet configured to deliver coolant to a radiator of the engine;

a thermostat chamber formed in the cylinder head, the thermostat chamber being in flow communication with a radiator inlet configured to receive coolant from the radiator, a bypass opening configured to receive coolant from the main return path, and a water pump return path configured to deliver coolant to a water pump of the engine; and a thermostat positioned in the thermostat chamber including a first valve plate, a second valve plate and a temperature sensitive element which causes the first valve plate and the second valve plate to move together between opened and closed positions depending upon a temperature of the coolant in the thermostat chamber, wherein the first valve plate is movable between a closed position wherein the first valve plate is seated against the radiator inlet to prevent coolant from flowing from the radiator into the thermostat chamber and an opened position wherein the first valve plate is spaced apart from the radiator inlet to permit coolant to flow from the radiator into the thermostat chamber, and wherein the second valve plate is movable between a closed position wherein the second valve plate is seated against the bypass opening to prevent coolant from flowing from the main return path into the thermostat chamber and an opened position wherein the second valve plate is spaced apart from the bypass opening to permit coolant to flow from the main return path into the thermostat chamber.

2. The thermostat configuration of claim 1, further comprising a tube cover mounted to the cylinder head, the tube cover including a radiator return conduit positioned to receive coolant from the radiator outlet and a radiator inlet conduit positioned to deliver coolant from the radiator to the radiator inlet.

3. The thermostat configuration of claim 1, wherein the thermostat further includes a first spring positioned to bias the first valve plate toward the closed position.

4. A water system for a 4-stroke 3-cylinder engine, comprising:

a cylinder head including:

a plurality of cylinders, a plurality of passageways in flow communication with the plurality of cylinders, a main return path in flow communication with the plurality of passageways, a radiator return path in flow communication with the main return path, a thermostat chamber, a radiator inlet conduit providing flow communication directly from the radiator to the thermostat chamber, a water pump return path in flow communication with the thermostat chamber, a water pump in flow communication with the water pump return path, and a plurality of coolant passageways in flow communication with the plurality of cylinders; and a thermostat positioned within the thermostat chamber and configured to control flows of coolant from the main return path and the radiator inlet conduit to the water pump based upon a temperature of coolant in the main return path.

5. The water system of claim 4, further comprising a tube cover mounted to the cylinder head and including a radiator return conduit in flow communication with the radiator return path to deliver coolant to a radiator and a radiator inlet conduit in flow communication with the thermostat chamber to deliver coolant from the radiator to the thermostat chamber.

6. A thermostat configuration, comprising:

a main return path formed in a cylinder head of an engine and configured to receive coolant from cylinders of the engine;

a radiator return path formed in the cylinder head and in flow communication with the main return path, the radiator return path also in flow communication with a radiator outlet configured to deliver coolant to a radiator of the engine;

a radiator inlet conduit providing flow communication from the radiator to the thermostat chamber;

a thermostat chamber formed in the cylinder head, the thermostat chamber being in flow communication with a radiator inlet configured to receive coolant from the radiator inlet conduit, a bypass opening configured to receive coolant from the main return path, and a water pump return path configured to deliver coolant to a water pump of the engine; and a thermostat positioned in the thermostat chamber including a first valve plate, a second valve plate and a temperature sensitive element which causes the first valve plate and the second valve plate to move together between opened and closed positions depending upon a temperature of the coolant in the thermostat chamber, wherein the first valve plate is movable between a closed position wherein the first valve plate is seated against the radiator inlet to prevent coolant from flowing from the radiator into the thermostat chamber and an opened position wherein the first valve plate is spaced apart from the radiator inlet to permit coolant to flow from the radiator into the thermostat chamber.

7. The thermostat configuration of claim 6, further comprising a tube cover mounted to the cylinder head, the tube cover including a radiator return conduit positioned to receive coolant from the radiator outlet and a radiator inlet conduit positioned to deliver coolant from the radiator to the radiator inlet.

8. The thermostat configuration of claim 6, wherein the thermostat further includes a first spring positioned to bias the first valve plate toward the closed position.

* * * * *